United States Patent
Matsuoka et al.

(10) Patent No.: US 8,556,660 B2
(45) Date of Patent: Oct. 15, 2013

(54) DEVICE CONNECTOR

(75) Inventors: Hiroyuki Matsuoka, Yokkaichi (JP); Takuya Tate, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 16 days.

(21) Appl. No.: 13/412,975

(22) Filed: Mar. 6, 2012

(65) Prior Publication Data
US 2012/0238143 A1    Sep. 20, 2012

(30) Foreign Application Priority Data
Mar. 15, 2011   (JP) .................................. 2011-056336

(51) Int. Cl.
*H01R 24/00* (2011.01)
(52) U.S. Cl.
USPC .......................................... 439/626; 439/606
(58) Field of Classification Search
USPC ................ 439/76.2, 542, 559, 566, 604, 606, 439/607.01, 626–629
See application file for complete search history.

(56) References Cited

U.S. PATENT DOCUMENTS

| | | | |
|---|---|---|---|
| 6,076,258 A | 6/2000 | Abe | |
| 7,017,498 B2 * | 3/2006 | Berg et al. | 105/206.1 |
| 7,572,150 B2 * | 8/2009 | Matsuoka | 439/626 |
| 7,828,591 B2 * | 11/2010 | Matsuoka | 439/559 |
| 8,187,030 B2 * | 5/2012 | Matsuoka et al. | 439/542 |
| 8,257,096 B2 * | 9/2012 | Matsuoka et al. | 439/76.2 |
| 8,317,544 B2 * | 11/2012 | Matsuoka et al. | 439/607.55 |
| 8,342,880 B2 * | 1/2013 | Kato et al. | 439/595 |
| 2008/0000668 A1 | 1/2008 | Maegawa et al. | |
| 2010/0297864 A1 | 11/2010 | Matsuoka | |

\* cited by examiner

*Primary Examiner* — Thanh Tam Le
(74) *Attorney, Agent, or Firm* — Gerald E. Hespos; Michael J. Porco; Matthew T. Hespos (57) ABSTRACT

A terminal block in which a plurality of metal conductive plates (10) to be connected to device-side busbars provided in a motor are made integral by a connector housing (50) includes a primary molded article (60) integrally formed to a primary molded portion (61) made of synthetic resin with a plurality of conductive plates (10) arranged side by side in a lateral direction; a metal plate to be attached and fixed to a motor case; and a secondary molded portion (70) integrally forming the primary molded article (60) and the metal plate (30). Resin entering spaces, into which molding resin for forming the secondary molded portion (70) can enter, are arranged to cross straight parts of the primary molded portion (61) extending in the lateral direction in the primary molded portion (61) before the secondary molded portion (70) is formed.

7 Claims, 13 Drawing Sheets

DEVICE CONNECTOR

BACKGROUND OF THE INVENTION

1. Field of the Invention

The invention relates to a device connector.

2. Description of the Related Art

U.S. Pat. No. 7,572,150 discloses a device connector to be connected to a device, such as a motor installed in an electric vehicle or a hybrid vehicle. This device connector includes metal busbars for connecting device-side terminals in the device and wire-side terminals on power feeding wires. The busbars are bent into complicated shapes and are arranged side by side. A molded resin portion is formed around the busbars by insert molding. A demolding structure for the molded resin portion is complicated and suitable boring cannot be performed on the molded resin portion. Thus, voids or small clearances may be produced in a thick part of the molded resin, and cracks may be formed due to the voids in the molded resin. The cracks may reduce the waterproof property of the device connector. To suppress the formation of voids in the molded resin, thought has been given to forming a primary molded article by primary molding to cover parts of the respective busbars by a primary molded synthetic resin portion, setting the primary molded article in a secondary molding die and forming the molded resin portion by further covering the primary molded portion by a secondary molded portion.

The amount of shrinkage of the secondary molded portion covering the primary molded portion in a cooling process is obtained by multiplying the length of the secondary molded portion covering a straight part of the primary molded portion by a linear expansion coefficient of molding resin. Thus, if the straight part of the primary molded portion is made longer, the amount of shrinkage of the secondary molded portion covering this straight part also increases. Therefore, the primary molded portion may be squashed by the secondary molded portion when secondary molding resin is cooled and solidified.

The present invention was completed in view of the above situation and an object thereof is to suppress the formation of voids and cracks in a molded resin portion.

SUMMARY OF THE INVENTION

The invention relates to a device connector that has a plurality of metal conductors that are to be connected to device-side terminals in a device. The metal conductors are made integral by a molded resin portion. The molded resin portion includes a primary molded article integrally formed to a primary molded portion made of synthetic resin with the conductors arranged substantially side by side. The devices connector also has a metal plate to be attached and fixed to the device. A secondary molded portion made of synthetic resin is formed integral to the primary molded article and the metal plate. The molded resin portion comprises the primary molded portion and the secondary molded portion. At least one resin entering space is provided in the primary molded portion before the secondary molded portion is formed and crosses a straight part of the primary molded portion extending in an arrangement direction of the conductors. Resin for forming the secondary molded portion can enter the resin entering space.

Voids that might otherwise form in a thick molded resin portion are suppressed since the molded resin portion is formed in separate steps that define the primary molded portion and the secondary molded portion. Further, the primary molded portion is formed with the resin entering space. Thus, a straight part of the primary molded portion can be divided by the resin entering space and the lengths of parts of the secondary molded portion individually covering the respective straight parts of the secondary molded portion can be shorter as compared with the case where no resin entering space is formed. This reduces the amounts of shrinkage of the parts of the secondary molded portion individually covering the respective straight parts of the primary molded portion when secondary molding resin is cooled and solidified. Thus, the secondary molded portion is not likely to squash the primary molded portion.

The resin entering space may be formed at least partly between two adjacent conductors. Accordingly, the resin entering space can be larger as compared with parts where the conductors are present, and the straight part of the primary molded portion arranged between adjacent resin entering spaces can be divided more effectively.

The primary molded article may comprise a plurality of cores individually formed for the respective conductors; and the resin entering space may be formed between two adjacent cores. The cores further suppress the formation of voids in the primary molded portion.

At least one contact portion may be provided at a back end portion of the resin entering space between the pair of adjacent cores and the adjacent cores may be in contact with each other via the contact portion in an injection direction in which the molding resin for forming the secondary molded portion is injected.

The straight part of the primary molded portion becomes longer if the cores are set in contact without any clearances therebetween in a die for forming the secondary molded portion. Thus, it is thought to form the secondary molded portion while providing the resin entering space between the adjacent cores by arranging the respective cores without holding them in contact. However, the cores are displaced by the influence of an injection pressure of the molding resin injected into a secondary molding die, and the secondary molded portion cannot be formed with the respective conductors at proper positions. However, the adjacent cores are in contact with each other via the contact portion in the injection direction of the molding resin. Thus, displacements of the respective cores in the injection direction of the molding resin can be suppressed while the straight part of the primary molded portion is divided. Thus, the secondary molded portion will not squash the primary molded portion by the secondary molded portion and the respective conductors will not be displaced from the proper positions.

The contact portion may comprise a first link on one of the pair of adjacent cores and a second linking on the other.

Parts of the first and second linking portions in contact with each other may be formed into a cranked shape by connecting first intersecting surfaces intersecting with the injection direction and second intersecting surfaces extending in the injection direction.

The first intersecting surfaces of the first and second links may come into surface contact with each other and the second intersecting surfaces thereof may come into surface contact with each other when the molding resin for forming the secondary molded portion is injected into a secondary molding die. According to this construction, even if a force for rotating the cores about the axis centers of the conductors acts due to the influence of the injection pressure of the molding resin, the first and second links come into contact in two directions including the injection direction of the molding resin, thereby suppressing displacements of the cores resulting from the rotation of the respective cores or the like. This can further suppress displacements of the respective conductors from the proper positions.

The resin entering space may be formed between two adjacent conductors.

The primary molded article may comprise a plurality of cores individually formed for the respective conductors and the resin entering space may be formed between two adjacent cores.

At least one contact may be provided at a back end of the resin entering space between the adjacent cores. Additionally, the adjacent cores may be in contact with each other via the contact portion in an injection direction in which the molding resin for forming the secondary molded portion is injected.

The contact portion may comprise a first link on one of the pair of adjacent cores and a second link on the other.

Parts of the first and second links in contact with each other may be formed into a cranked shape by connecting first intersecting surfaces intersecting the injection direction and second intersecting surfaces extending in the injection direction.

The first intersecting surfaces of the first and second links may come into surface contact with each other and the second intersecting surfaces thereof come into surface contact with each other when the molding resin for forming the secondary molded portion is injected into a secondary molding die.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
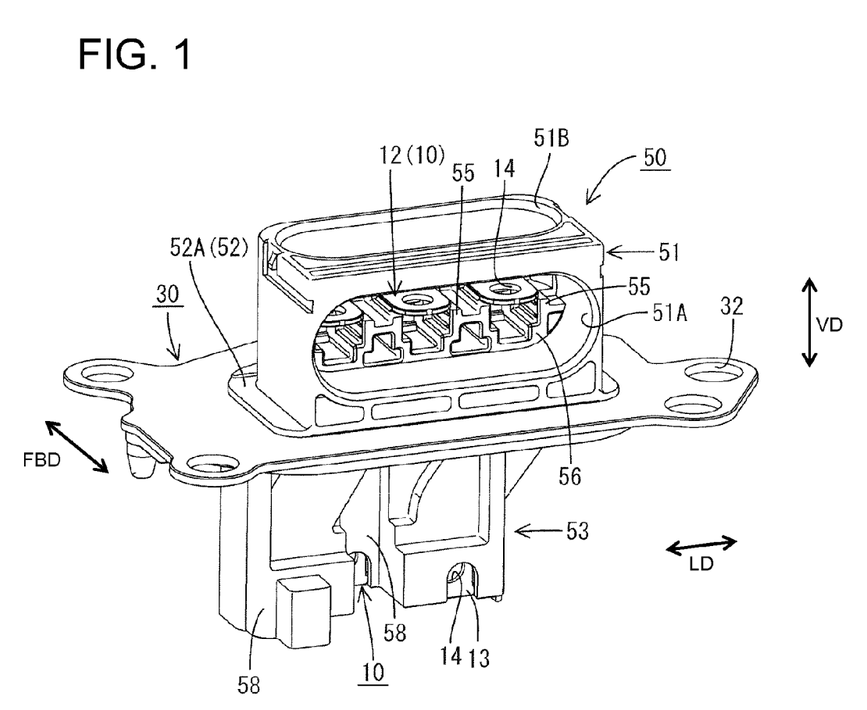
FIG. 1 is a perspective view of a terminal block according to an embodiment.

A device connector in accordance with the invention is a terminal block that is to be attached to a metal motor case (not shown) that houses a motor, or other such device. As shown in FIG. 1, the terminal block includes a metal plate 30 to be attached and fixed to the motor case, a molded resin housing 50 molded to be integral to the metal plate 30, and three conductive plates 10 held in the housing 50 while penetrating through the metal plate 30 in a plate thickness direction TD.

First ends of the conductive plates 10 are to be bolt-fastened to unillustrated device-side busbars at the motor case for electrical connection. On the other hand, in an inverter or other such power supply device for supplying power such as an inverter, wires are arranged to extend toward the motor case and an unillustrated wire-side connector is provided at ends of the wires. Wire-side terminals connected to respective wire ends are provided in the wire-side connector and are bolt-fastened to the second ends of the respective conductive plates 10 for electrical connection. Note that, in the following description, a vertical direction VD is a vertical direction in FIG. 2 and a lateral direction LD is a lateral direction in FIG. 2.

Figure 7:
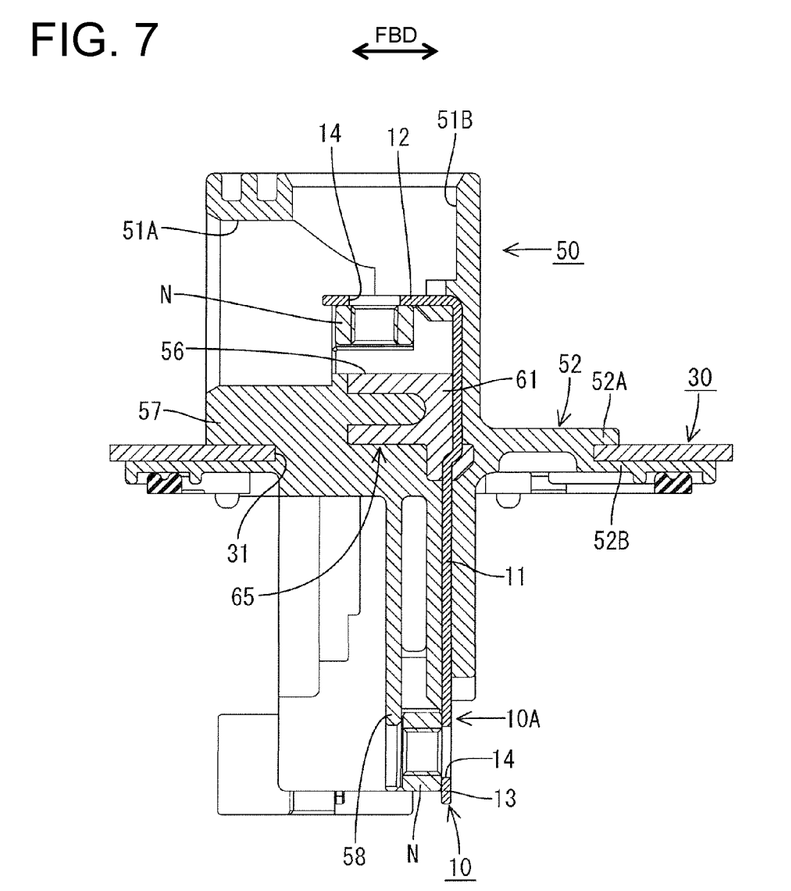
FIG. 7 is a section along VII-VII of FIG. 2.

Each conductive plate 10 is formed from a conductive metal plate with good electrical conductivity. The metal plate is punched or cut into a specified shape by a press, and then is subjected to a specified bending process. As shown in FIG. 7, the conductive plate 10 includes a terminal main portion 11, a wire-side fastening portion 12 extending forward from the upper end of the terminal main portion 11, and a device-side fastening portion 13 at a lower end of the terminal main portion 11. The terminal main portion 11 is formed longer than the wire-side fastening portion 12.

Figure 2:
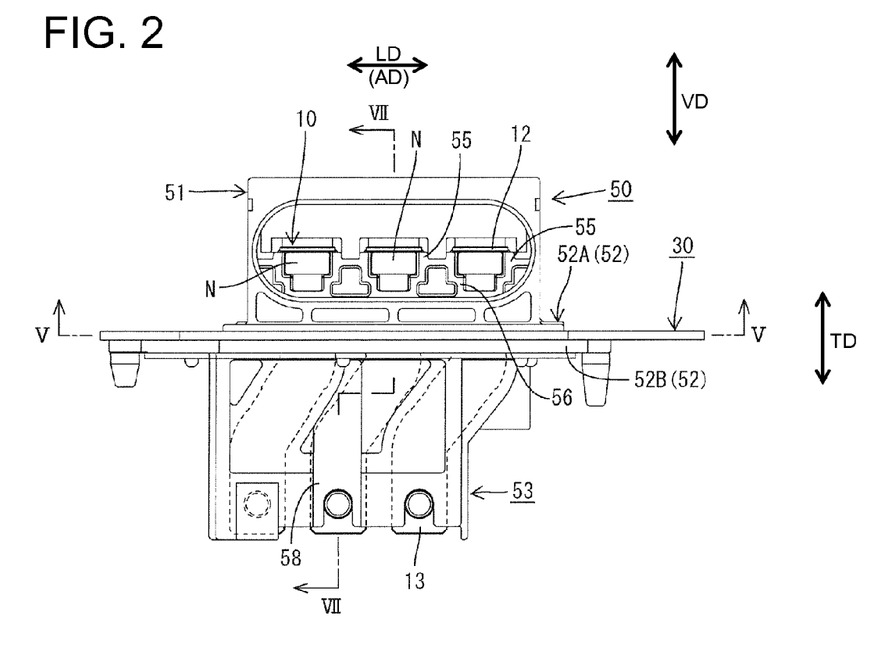
FIG. 2 is a front view of the terminal block according to the embodiment.

As shown in FIG. 2, three conductive plates 10 are arranged substantially side by side in the lateral direction LD. Further, the terminal main portions 11 are cranked slightly in the lateral direction LD at intermediate positions. Each wire-side fastening portion 12 and each device-side fastening portion 13 has a bolt insertion hole 14 through which a fastening bolt (not shown) is insertable.

Figure 11:
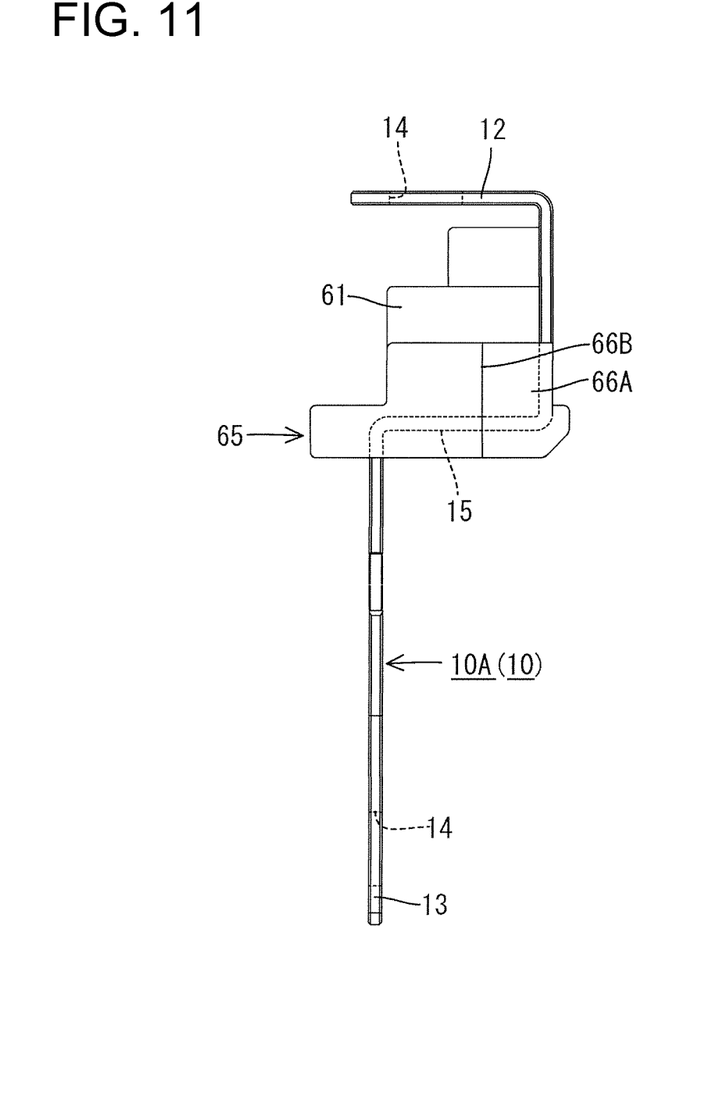
FIG. 11 is a side view of the left core.

The terminal main portion 11 of the conductive plate 10A in the center position extends substantially in the vertical direction VD and is substantially flat as shown in FIG. 7. As shown in FIG. 11, the lateral terminal main portions 11, 11 of the conductive plates 10B, 10B at the opposite left and right sides each has a folded portion 15 bent forward to face the wire-side fastening portion 12 at a substantially vertically central part of the terminal main portion 11 and the front end of the folded portion 15 is bent down at substantially the same position as the front end of the wire-side fastening portion 12.

The metal plate 30 is flat and an opening 31 penetrates through the metal plate 30 in a plate thickness direction TD of the plate material. The housing 50 includes a wire-side fitting 51, a plate-like flange 52 and a device-side fitting 53. The wire-side fitting 51 vertically penetrates through the opening 31 and is molded to be integral to the metal plate 30 at a position above the metal plate 30. The flange 52 bulges out laterally at the height position of the metal plate 30. The device-side fitting 53 is below the metal plate 30.

The wire-side fitting 51 is a wide box with a front opening 51A and an upper opening 51B, as shown in FIG. 1. The wire-side connector can fit into the front opening 51A of the wire-side fitting 51.

As shown in FIG. 2, three nut accommodating portions 55 are formed substantially side by side in the lateral direction LD in the wire-side fitting portion 51. Each nut accommodating portion 55 is open forward and up. More particularly, each nut accommodating portion 55 faces forward through the front opening 51A and up through the upper opening 51B. Nuts N are press-fit through the front end opening 51A from the front and are accommodated in the nut accommodating portions 55 so that the axis lines of the nuts N are aligned with the vertical direction VD.

Figure 3:
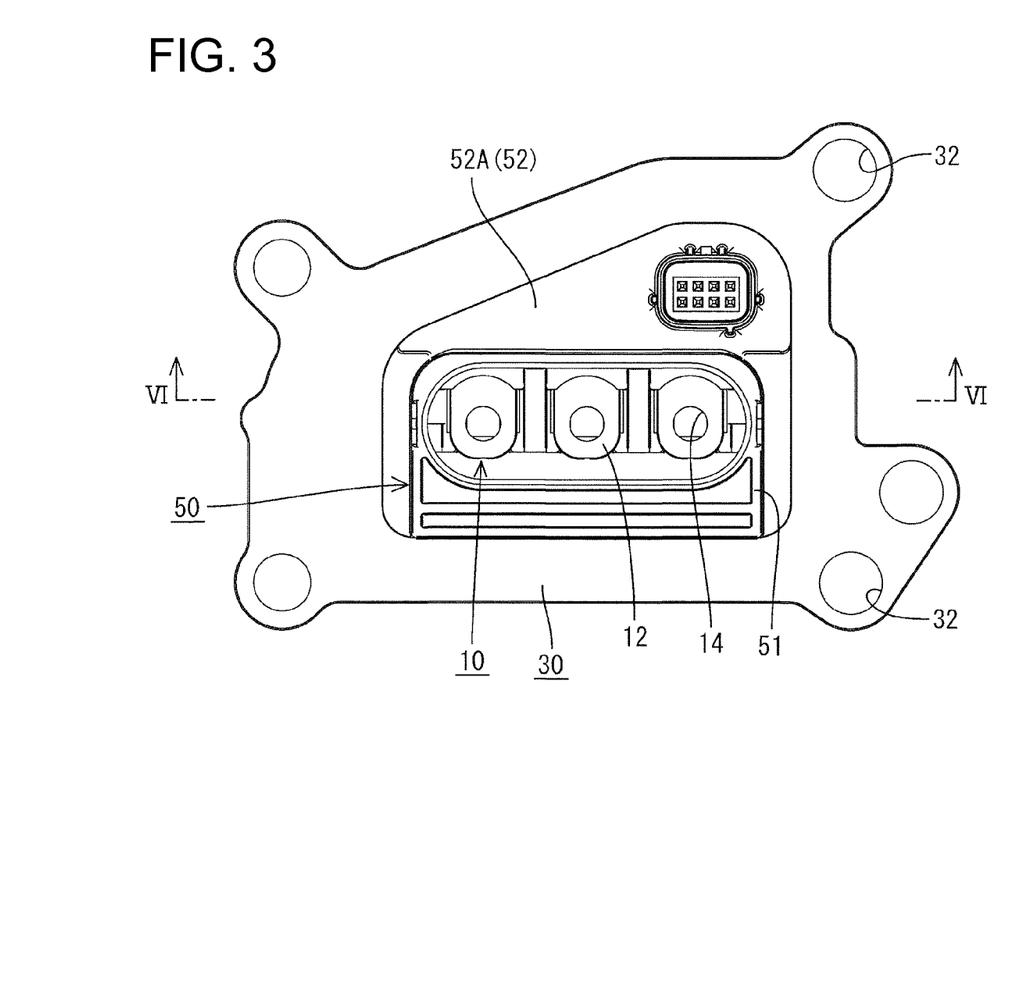
FIG. 3 is a plan view of the terminal block according to the embodiment.
Figure 4:
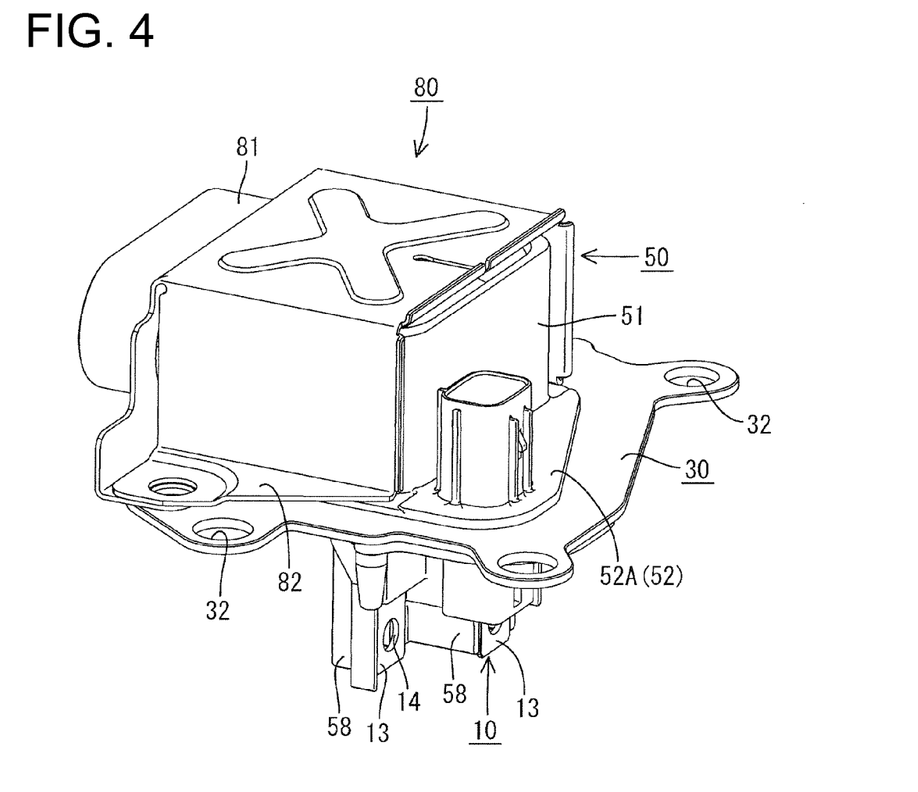
FIG. 4 is a perspective view showing a state where a shielding shell is mounted on the terminal block according to the embodiment.
Figure 6:
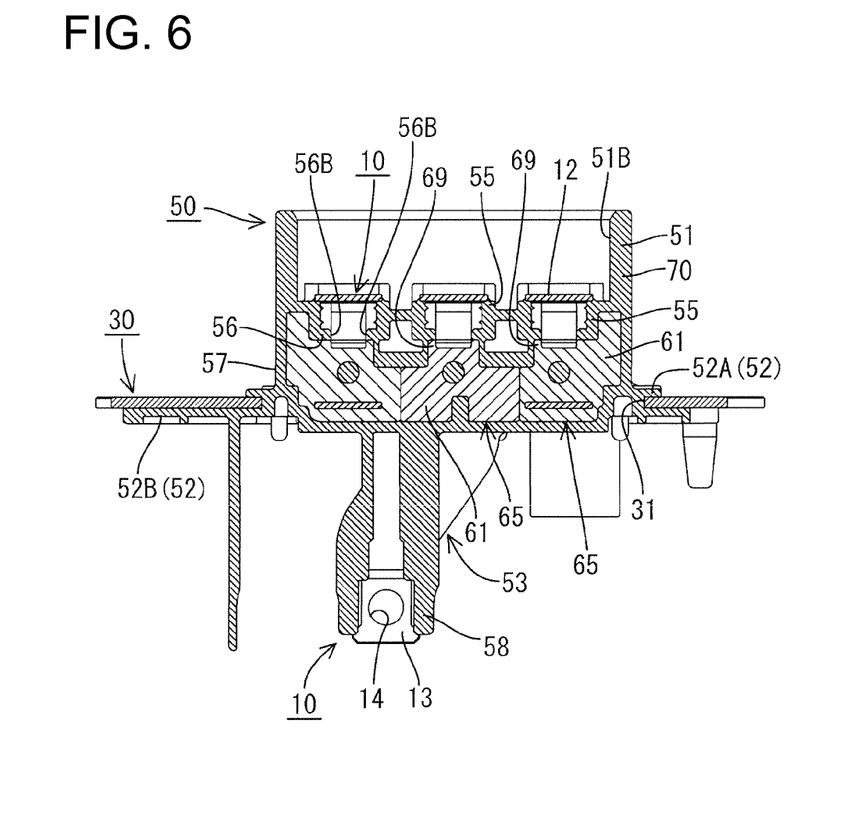
FIG. 6 is a section along VI-VI of FIG. 3.

The wire-side fastening portions 12 of the conductive plates 10 are arranged to close the upper end openings of the nut accommodating portions 55 as shown in FIGS. 3 and 4. Further, as shown in FIG. 6, each conductive plate 10 is arranged to penetrate through the opening 31 in the vertical direction VD and is held in the housing 50 so that the wire-side fastening portion 12 is arranged around the bolt insertion hole 14 and is exposed forward and up in the wire-side fitting 51. On the other hand, the device-side fastening portion 13 is arranged around the bolt insertion hole 14 and is exposed backward at the lower end of the device-side fitting 53. Each wire-side fastening portion 12 is exposed to the outside through the upper end opening 51B of the wire-side fitting 51. That is, the upper end opening 51B of the wire-side fitting 51 may be used as a service hole for insert a tool or the like for a bolt fastening operation. The wire-side terminal is placed on the wire-side fastening portion 12 and the tool is inserted inside through the upper end opening 51B to threadedly engage the fastening bolt with the nut N, so that the conductive plate 10 and the wire-side terminal are connected electrically. Note that a service cover (not shown) is mounted on or to the upper end opening 51B of the wire-side fitting portion 51 after bolt fastening, thereby closing the upper end opening 51B.

An escaping recess 56 is provided below each nut accommodating portion 55 for allowing a leading end part of the fastening bolt penetrating through the nut N to escape when the fastening bolt is fastened to the nut N. The escaping recess 56 is narrower than the nut accommodating portion 55 in the lateral direction LD and is formed unitarily with the nut accommodating portion 55 by a slide die 92 to be described later.

As shown in FIG. 4, a metal shielding shell 80 is mounted on the wire-side fitting 51 and at least partly covers the wire-side fitting 51 except the rear surface. The shielding shell 80 is formed by using a press to punch or cut a metal plate with good electrical conductivity and then performing a specified bending process on the punched or cut conductive plate. The shielding shell 80 includes a wide tubular fixing portion 81 and a braided wire can be crimped to the tubular fixing portion 81 by a crimp ring to collectively cover shielded conductive paths of the wire-side connector. The shielding shell 80 also has a fixing piece 82 for fixing the shielding shell 80 to the metal plate 30 and electrically connecting the shielding shell 80 and the metal plate 30.

The flange 52 is molded to be integral to the metal plate 30 in a range not reaching an outer peripheral edge of the metal plate 30. Thus, the outer peripheral edge of the metal plate 30 is exposed. More particularly, the flange 52 includes a wire-side flange 52A and a device side flange 52B. The wire-side flange 52A is at a side of the wire-side fitting 51 and extends in the lateral direction LD and backward. The device-side flange 52B is at a side of the device-side fitting 53 and covers a surface of the metal plate 30 at the side of the device-side fitting 53.

Figure 5:
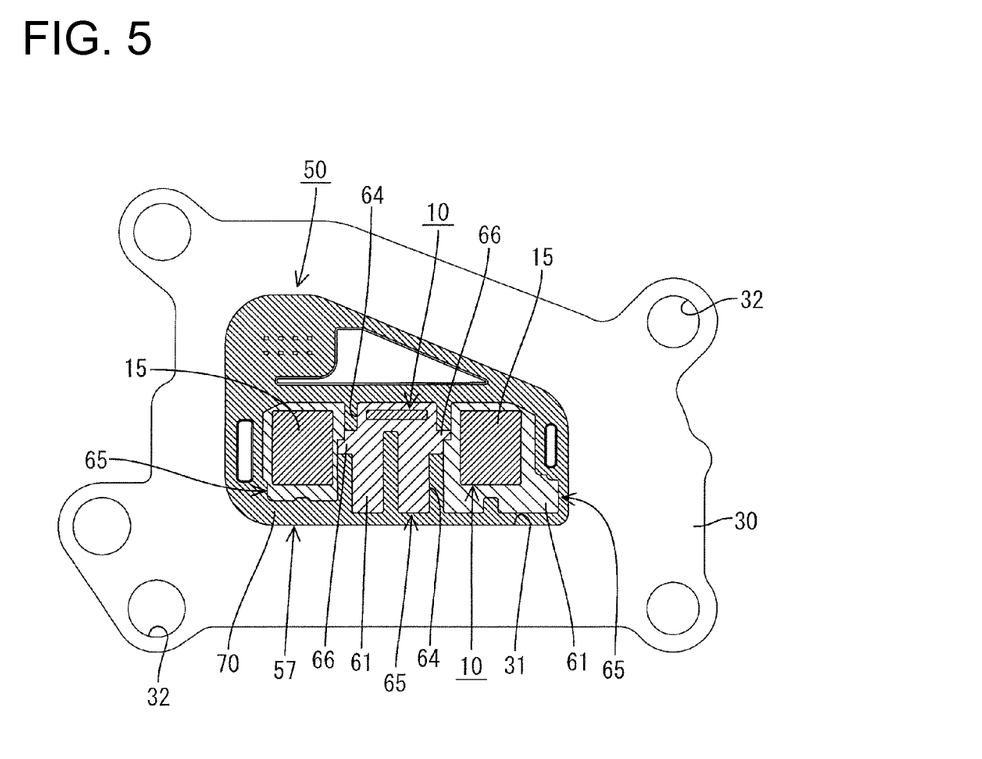
FIG. 5 is a section along V-V of FIG. 2.

The opening 31 has a substantially trapezoidal shape as shown in FIG. 4. Further, the folded portions 15 of the conductive plates 10 at the left and right sides and the terminal main portion 11 of the central conductive plate 10 are arranged in the opening 31. On the other hand, a thick portion 57 having a thick resin layer is formed from a lower part of the wire-side fitting 51 to an upper part of the device-side fitting portion 53, as shown in FIGS. 5 to 7. That is, the three conductive plates 10 having a complicated shape penetrate through the opening 31 of the metal plate 30 in this thick portion 57.

Mounting holes 32 are formed near the outer periphery of the metal plate 30. Unillustrated fixing bolts or rivets are inserted through these mounting holes 32 and fastened to the motor case so that the terminal block can be fixed to the motor case.

The device-side fitting 53 is housed in the motor case when the terminal block is fixed to the motor case. Further, as shown in FIG. 1, three nut accommodating portions 58 are formed in the device-side fitting 53. Specifically, the nut accommodating portion 58 in the center position is arranged behind the other nut accommodating portions 58. The fastening bolts are engaged threadedly with respective nuts N in the nut accommodating portions 58 of the device-side fitting 53 for electrically connecting the conductive plates 10 and the device-side busbars similar to the nut accommodating portions 55 of the wire-side fitting 51. In this way, the wire-side terminals and the device-side busbars are connected electrically using the conductive plates 10 as intermediate terminals.

The housing 50 comprises a primary molded portion 61 made e.g. of synthetic resin and molded to be integral to the conductive plates 10 by primary molding and a secondary molded portion 70 made e.g. of synthetic resin and molded to be integral to the primary molded portion 61 by secondary molding, and formed in two separate processes.

Figure 8:
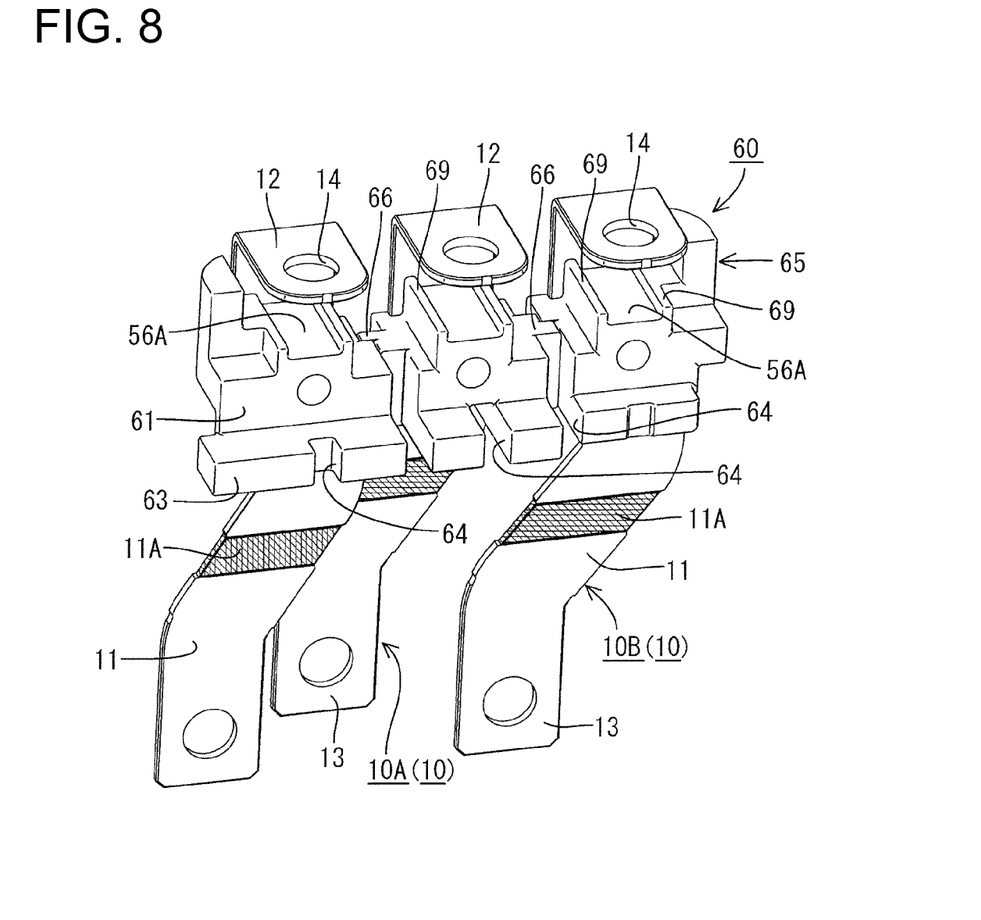
FIG. 8 is a perspective view showing a state where three cores are arranged in contact.
Figure 9:
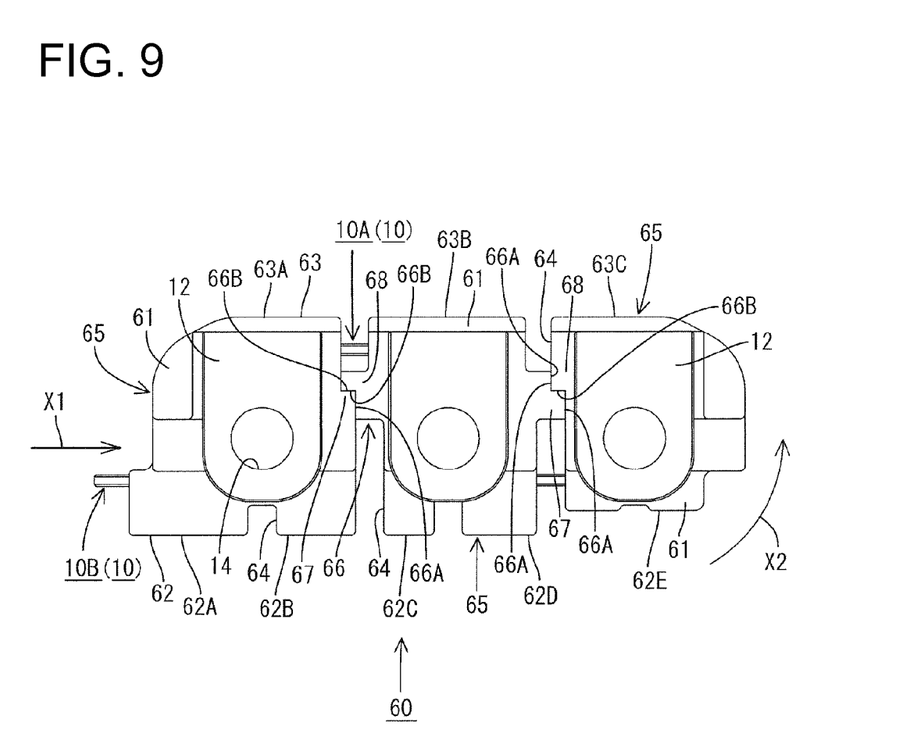
FIG. 9 is a plan view showing the state where the three cores are arranged in contact.

A primary molded article 60 formed by primary molding comprises the conductive plates 10 and the primary molded portion 61 made of synthetic resin and covering parts of the terminal main portions 11 of the conductive plates 10 to define a unitary matrix or synthetic resin surrounding portions of the conductive plates 10. As shown in FIGS. 8 and 9, the conductive plates 10 are held in the primary molded portion 61 while being arranged at equal intervals in the lateral direction.

As shown in FIG. 8, the primary molded portion 61 is roughly in the form of a substantially rectangular block longer in the lateral direction LD when viewed from above, and covers vertical central parts of the terminal main portions 11 of the respective conductive plates 10 over substantially the entire peripheries. The terminal main portion 11 of the conductive plate 10A in the center position is covered while vertically penetrating through a rear part of the primary molded portion 61, and the terminal main portions 11 of the conductive plates 10B located at the left and right sides are covered in the rear part of the primary molded portion 61 and the folding portions 15 thereof are covered in a lower part of the primary molded portion 61, as shown in FIG. 11. In other words, as shown in FIGS. 1 and 11, the primary molded portion 61 covers cranked parts of the terminal main portions 11 of the respective conductive plates 10, and these covered parts are subject to an injection pressure of molding resin injected from the lateral side. Sealing portions 11A where an adhesive is to be applied are provided below the parts of the terminal main portions 11 of the respective conductive plates 10 covered by the primary molded portion 61 and adhere to the secondary molded portion 70 to prevent the entry of water or the like into the housing 50 when the secondary molded portion 70 is formed.

Figure 10:
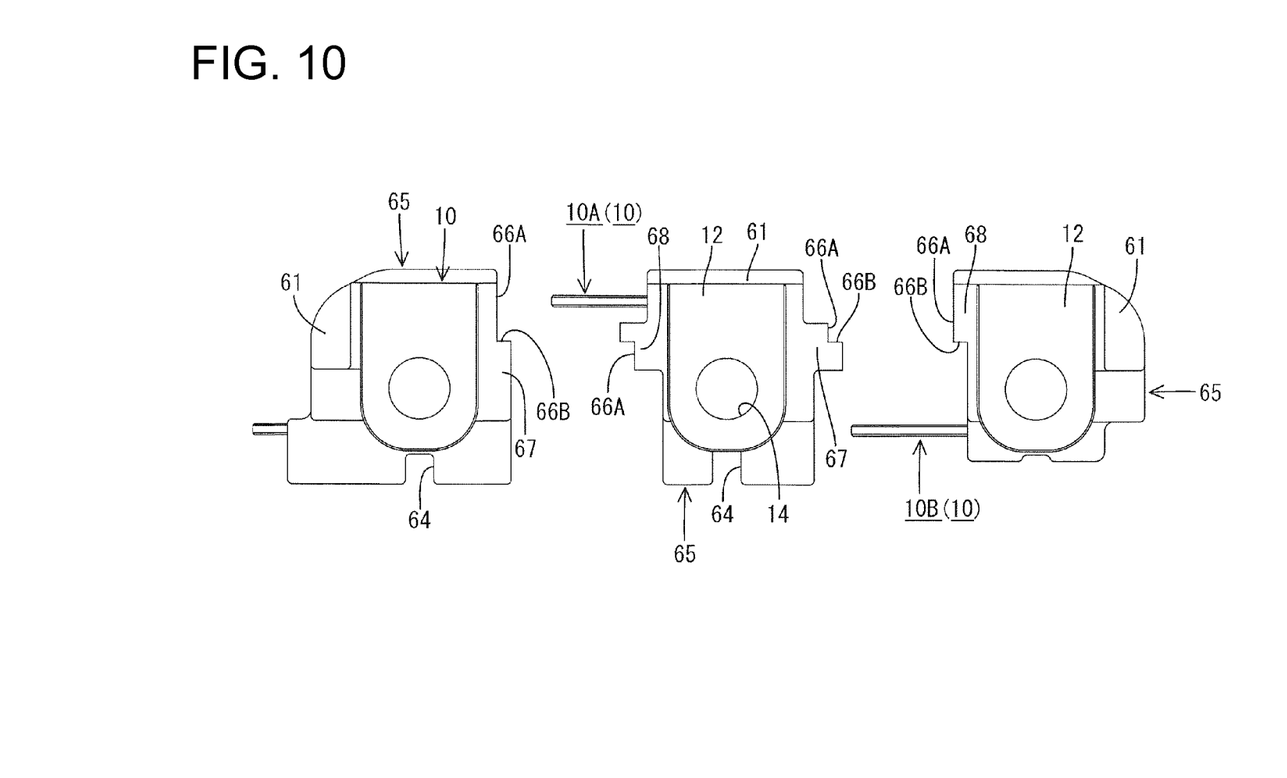
FIG. 10 is a plan view showing a state where the three cores are arranged while being spaced apart.

Resin entering spaces 64 are formed in a front end surface 62 and a rear end surface 63 of the primary molded portion 61 and extend substantially straight in forward and backward directions FBD (directions crossing the lateral direction LD and an arrangement direction AD of the conductive plates 10) as shown in FIGS. 9 and 10. The resin entering spaces 64 can receive molding resin when the secondary molded portion 70 is formed. Each resin entering spaces 64 has a substantially rectangular plan view and is formed between the adjacent conductive plates 10 in the primary molded portion 61, in a part aligned with the left conductive plate 10B in the primary molded portion 61 and in a part aligned with the center conductive plate 10A in the front surface of the primary molded portion 61. Further, the resin entering spaces 64 between the adjacent conductive plates 10 are longer in forward and backward directions FBD than the resin entering spaces 64 aligned with the conductive plates 10. The resin entering spaces 64 between the adjacent conductive plates 10 are formed so that contact portions 66 remain at substantially central parts of the primary molded portion 61 in forward and backward directions FBD and at the back ends of the resin entering spaces 64. Thus, a straight part of the front end surface 62 of the primary molded article 60 extending in the lateral direction LD is divided by the resin entering spaces 64, as shown in FIG. 9. As a result, the front end surface 62 has straight parts 62A, 62B, 62C, 62D and 62E substantially extending in the lateral direction LD one after another. The lengths of the respective straight parts 62A, 62B, 62C, 62D and 62E extending in the lateral direction LD one after another are shorter than the length of the straight part continuously extending in the lateral direction LD when the front end surface 62 of the primary molded article 60 is not divided by the resin entering spaces 64.

The rear end surface 63 of the primary molded article 60 also is divided in the lateral direction LD by the resin entering spaces 64. As a result, the rear end surface 63 is composed of substantially straight parts 63A, 63B and 63C extending in the lateral direction LD one after another. The lengths of the respective straight parts 63A, 63B and 63C extending in the lateral direction LD one after another are shorter than the length of the substantially straight part continuously substantially extending in the lateral direction LD when the rear end surface 63 of the primary molded article 60 is not divided by the resin entering spaces 64.

As shown in FIG. 9, three cores 65, 65, 65 particularly are in contact in the lateral direction LD in the primary molded article 60. The respective cores 65, 65, 65 are divided at the resin entering spaces 64 between the adjacent conductive plates 10, 10, and the adjacent cores 65, 65 are connected in the lateral direction LD by the contact portion 66 formed at the back ends of the resin entering spaces 64. Thus, the adjacent cores 65, 65 are in contact in the lateral direction LD via the contact portion 66.

The contact portion 66 comprises a first link 67 extending laterally to the right from the primary molded portion 61 of the core 65 on the left side and a second link 68 extending laterally to the left from the primary molded portion 61 of the core 65 located on the right side.

Each link 67, 68 is at an angle, preferably substantially perpendicular, to an injection direction (lateral direction LD) and includes two first surfaces 66A displaced in the lateral direction LD and a second surface 66B located between the two first surfaces 66A, 66A and substantially perpendicular to the first surfaces 66A. The two first surfaces 66A, 66A and the second surface 66B are connected in a cranked manner. The two first surfaces 66A, 66A of the link 67 and the two first surfaces 66A, 66A of the link 68 are in surface contact in the injection direction, and the second surface 66B of the link 67 and the second surface 66B of the link 68 are in surface contact in a direction at an angle, preferably substantially perpendicular to the injection direction. That is, parts of the respective links 67, 68 held in surface contact with each other form a cranked shape obtained by connecting the two first surfaces 66A and the second surface 66B, as shown in FIG. 9, and the adjacent cores 65, 65 are held in surface contact with each other in forward and backward directions FBD and lateral direction LD.

Two tight holding portions 69, 69 project up on the top of each core 65 and face each other in the lateral direction LD, as shown in FIG. 8. The tight holding portions 69 extend in forward and backward directions FBD, and tightly hold the slide die 92 from opposite sides when forming the nut accommodating portions 55 and the escaping recesses 56 of the housing 50 during secondary molding. A bottom wall 56A extends between the lower ends of the tight holding portions 69, 69 in each pair. A length from the bottom walls 56A to the wire-side fastening portions 12 above the nut accommodating portions 55 is set to be substantially equal to a length that is the sum of the heights of the nut accommodating portions 55 and the escaping recesses 56 in the housing 50, and the wire-side fastening portions 12 and the bottom walls 56A tightly hold the slide die 92 from upper and lower sides when secondary molding is performed.

The secondary molded portion 70 formed by secondary molding is such that the primary molded portion 61 of the primary molded article 60 penetrates through the opening 31 of the metal plate 30 in forward and backward directions FBD as shown in FIGS. 5 and 6, and the secondary molded portion 70 forms part of the housing 50 together with the primary molded portion 61. At the time of secondary molding, molten molding resin to be molded into the secondary molded portion 70 enters the resin entering spaces 64 of the primary molded article 60 and flows to both upper and lower surfaces of the metal plate 30. Thus, the primary molded article 60 and the metal plate 30 are formed integrally. Voids in the thick portion 57 of the connector housing 50 are suppressed or reduced by arranging the primary molded portion 61 of the primary molded article 60 in the thick portion 57 of the housing 50 and forming the thick portion 57, which is thickest in the housing 50, in the primary molded portion 61 and the secondary molded portion 70. This can prevent crack formation in the thick portion 57 due to voids and a reduction in the waterproof property of the terminal block. Further, since the primary molded article 60 is formed as three separate parts for the respective conductive plates 10, the formation of voids in the primary molded portion 61 can be further suppressed.

The respective cores 65, 65, 65 are set one next to another in the lateral direction LD in a lower die 91 of upper and lower dies 90, 91 that are opened in the vertical direction VD for secondary molding, while being held in surface contact at the respective contact portions 66. The adjacent cores 65, 65 can be set in the lower die 91 only by bringing the respective cranked links 67, 68 into surface contact in forward and backward directions FBD and lateral direction LD. Thus, a process of setting the cores 65 in the lower die 91 can be simplified as compared with the case where the links are engaged with each other by mating engagement. Further, a die for forming the primary molded portion 61 can be simplified and production cost of the die for primary molding can be reduced as compared with the case where the respective links 67, 68 are formed as projections and recesses.

Figure 12:
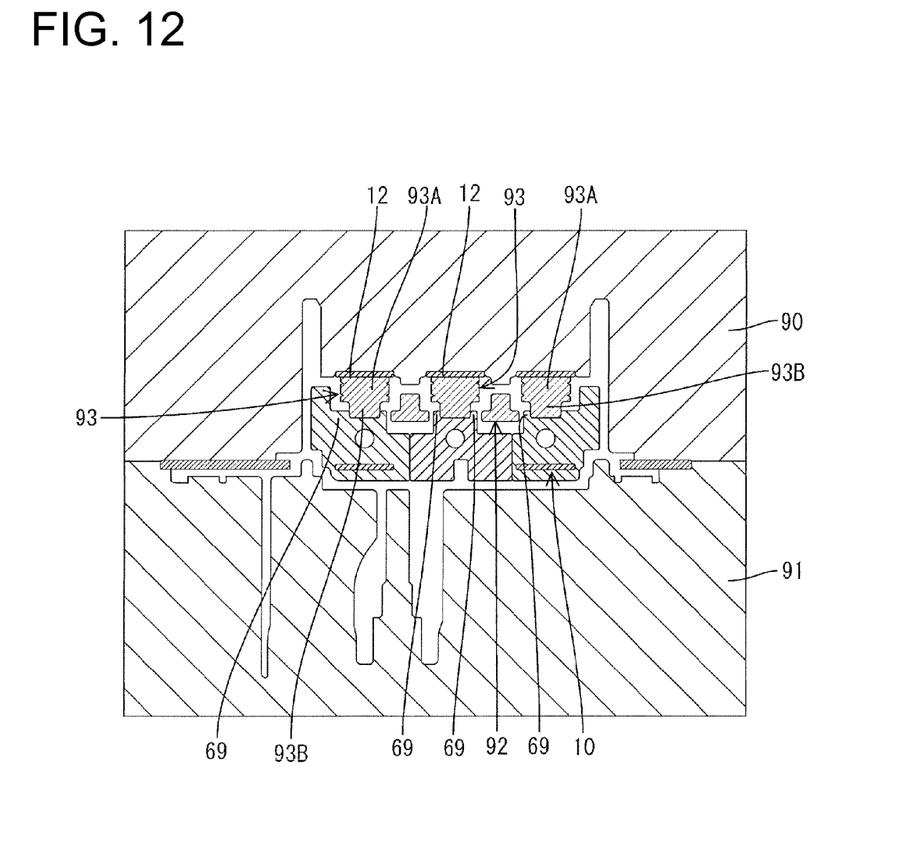
FIG. 12 is a section showing a state where the cores are held by upper and lower dies and a slide die.
Figure 13:
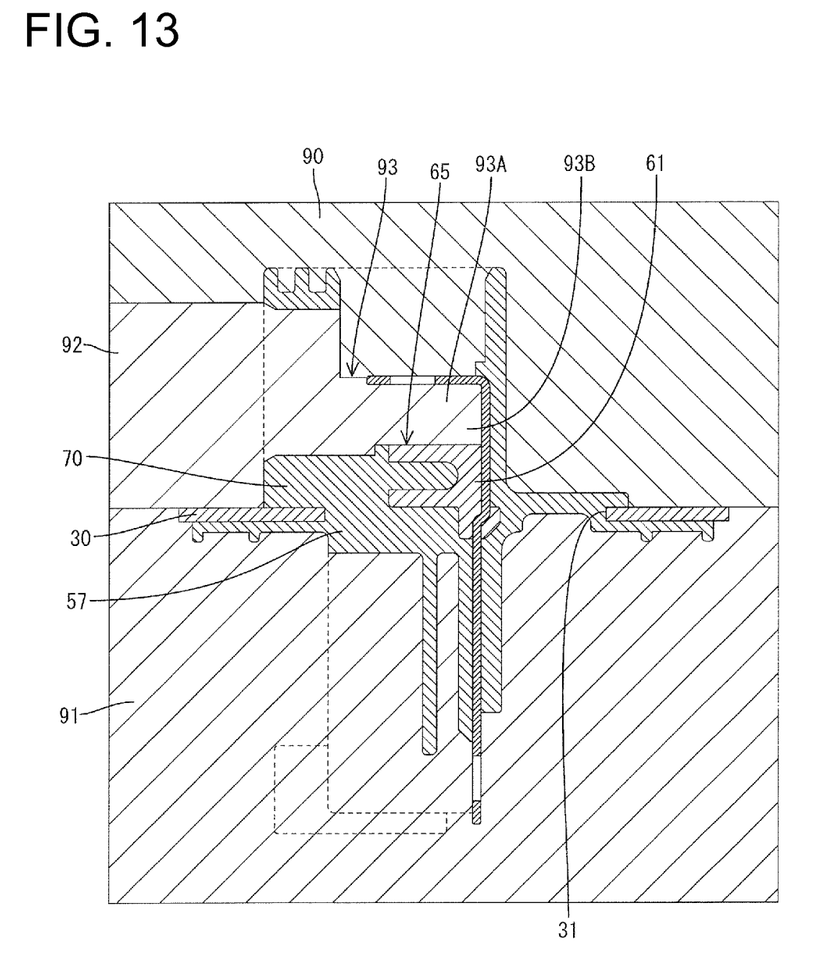
FIG. 13 is a section showing a state where a secondary molded portion is formed in the upper and lower dies and the slide die.

When all of the cores 65 are set in the lower die 91, the slide die 92 is inserted from front into spaces substantially enclosed by the pairs of tight holding portions 69, 69 of the respective cores 65, 65, 65, the wire-side fastening portions 12 and the bottom walls 56A. The die then is clamped so that the upper and lower dies 90, 91 sandwich all of the cores 65 from the upper and lower sides, as shown in FIG. 13. At this time, the slide die 92 is assembled to be held tightly from the left and right sides by the pairs of tight holding portions 69, 69 and from the upper and lower sides by the wire-side fastening portions 12 and the bottom walls 56A. Specifically, as shown in FIGS. 12 and 13, the slide die 92 includes three molding pins 93 each comprising a nut accommodating portion forming portion 93A and an escaping recess forming portion 93B narrower than the nut accommodating portion forming portion 93A in the lateral direction LD. The escaping recess forming portions 93B are held tightly from the left and right sides by the pairs of the tight holding portions 69, 69 of the primary molded portion 61.

Subsequently, the secondary molded portion 70 is formed by injecting molten molding resin, for example, from the back side to the front side of the plane of FIG. 13 from an unillustrated gate provided at a lateral side of the upper and lower dies 90, 91, thereby forming the connector housing 50 as shown in FIG. 13. At this time, the molding resin is received by the left surface of the primary molded portion 61 in the respective cores 65, 65, 65, and the respective cores 65, 65, 65 try to move in an injection direction X1 of the molding resin and in a counterclockwise rotational direction X2 about the centers of the axis lines of the conductive plates 10, as shown in FIG. 9. However, the respective cores 65, 65, 65 are connected in surface contact with each other by the contact portions 66 (first surfaces 66A). Thus, all of the cores 65 become integral, thereby resisting the injection pressure of the molding resin and suppressing displacements of the respective cores 65, 65, 65 in the injection direction. Further, the contact portions 66 (second surfaces 66B) come into surface contact in forward and backward directions FBD, thereby restricting clockwise rotational forces about the axis centers of the conductive plates 10 and suppress displacements of the respective cores 65, 65, 65.

The respective cores 65, 65, 65 tightly hold the slide die 92 in vertical and lateral directions using the pairs of tight holding portions 69, 69, the wire-side fastening portions 12 and the bottom walls 56A. Thus, displacements of the cores 65, 65, 65 in the injection direction are suppressed further and vertical displacements thereof also are suppressed. Displacements of the conductive plates 10 resulting from displacements of the cores 65, 65, 65 also are suppressed. Note that the pairs of the tight holding portions 69, 69 of the respective cores 65, 65, 65 in the primary molded portion 61 form pairs of inner walls 56B, 56B facing each other in the escaping recesses 56 of the housing 50 together with the secondary molded portion 70, as shown in FIG. 6.

The secondary molded portion 70 formed as described above is cured by being cooled, and together with the primary molded portion 61 forms the housing 50. In this cooling process, the secondary molded portion 70 is cured and shrinks and could squash part of the primary molded portion 61 covered thereby. However, in this embodiment, the straight parts of the front and rear end surfaces 62, 63 of the primary molded portion 61 are divided by the resin entering spaces 64, and the lengths of the parts of the secondary molded portion 70 individually covering the respective straight parts 62A, 62B, 62C, 62D, 62E, 63A, 63B and 63C of the respective cores 65 are short. Thus, as compared with the case where the primary molded portion is formed with no resin entering spaces 64, the amount of shrinkage of the secondary molded portion 70 individually covering the respective straight parts 62A, 62B, 62C, 62D, 62E, 63A, 63B and 63C of the respective cores 65, 65, 65 is smaller. In this way, the squashing of the primary molded portion 61 by the secondary molded portion 70 can be suppressed. Further, the resin entering spaces 64 extend in forward and backward directions FBD and are larger between the adjacent cores 65, 65 than in the other parts. Thus, it is possible to further effectively divide the primary molded portion 61 and further suppress the influence of cure shrinkage in the secondary molded portion 70.

Further, since the escaping recess forming portions 93B of the slide die 92 particularly are tightly held by the pairs of tightly holding portions 69, 69 upon forming the secondary molded portion 70 in this embodiment, the width of the primary molded portion 61 in the lateral direction LD can be shortened and the thickening of the primary molded portion 61 in the lateral direction LD can be suppressed as compared with the case where pairs of tightly holding portions for tightly holding the nut accommodating portion forming portions 93A for forming the nut accommodating portions 55 are provided. This can further suppress the formation of voids in the primary molded portion 61.

The invention is not limited to the above described embodiment. For example, the following embodiments also are included in the scope of the invention.

Although the primary molded article 60 is divided into the three cores 65 in the above embodiment, the present invention is not limited to such a mode. For example, the primary molded article 60 may not be divided.

Although the terminal block includes the shielding shell 80 in the above embodiment, the present invention is not limited to such a mode. For example, the present invention may be applied to a terminal block which requires no shielding shell.

Although the connector housing 50 is formed with the primary molded portion 61 penetrating through the opening 31 of the metal plate 30 in the above embodiment, the present invention is not limited to such a mode. For example, the primary molded portion 61 may not penetrate through the opening 31 of the metal plate 30.

What is claimed is:

1. A device connector for connection to device-side terminals in a device, comprising:
    a primary molded article having a plurality of conductors arranged substantially side by side in an arrangement direction and at least one primary molded portion formed of synthetic resin and surrounding parts of the conductors, at least one resin entering space extending into the primary molded portion in a direction intersecting the arrangement direction;
    a metal plate to be attached and fixed to the device; and
    a secondary molded portion defining a unitary matrix of synthetic resin surrounding and supporting parts of the primary molded article and the metal plate and extending into the resin entering space.

2. The device connector of claim 1, wherein the resin entering space is formed between two of the conductors that are adjacent to one another.

3. The device connector of claim 1, wherein the primary molded article comprises a plurality of cores individually formed for the respective conductors, and the resin entering space is formed between two of the cores that are adjacent to one another.

4. The device connector of claim 3, wherein at least one contact portion is provided at a back end of the resin entering space between the cores that are adjacent to one another; the adjacent cores being in contact with each other via the contact portion in an injection direction in which the molding resin for forming the secondary molded portion is injected.

5. The device connector of claim 4, wherein the contact portion comprises a first link provided on one of the adjacent cores and a second link provided on the other of the adjacent cores.

6. The device connector of claim 5, wherein parts of the first and second links in contact with each other are formed into a cranked shape and have first intersecting surfaces intersecting the injection direction and second intersecting surfaces extending in the injection direction.

7. The device connector of claim 6, wherein the first intersecting surfaces of the first and second links come into surface contact with each other and the second intersecting surfaces thereof come into surface contact with each other when the molding resin for forming the secondary molded portion is injected into a secondary molding die.

* * * * *